United States Patent [19]

Hiltz et al.

[11] Patent Number: 4,713,182

[45] Date of Patent: Dec. 15, 1987

[54] FIRE-FIGHTING FOAM

[75] Inventors: Ralph H. Hiltz, Allison Park; John S. Greer, Ellwood City; Joseph V. Friel, Butler, all of Pa.

[73] Assignee: Mine Safety Appliances Company, Pittsburgh, Pa.

[21] Appl. No.: 927,386

[22] Filed: Nov. 6, 1986

[51] Int. Cl.$^4$ .......................... A62D 1/00; B01J 13/00; C09K 3/00; B01F 17/00

[52] U.S. Cl. ....................................... 252/3; 252/8.05; 252/307; 252/350; 252/351; 252/353

[58] Field of Search ...................... 252/2, 3, 6, 5, 8.05, 252/307, 174.23, DIG. 5, DIG. 7, DIG. 13, DIG. 2, 603, 350–357; 424/70; 261/DIG. 26; 169/46, 47, 69, 65; 106/18.11

[56] References Cited

U.S. PATENT DOCUMENTS

| | | | |
|---|---|---|---|
| 2,956,947 | 10/1960 | Carter | 252/3 |
| 3,634,233 | 1/1972 | Hiltz | 252/3 |
| 3,839,425 | 10/1974 | Bartlett | 252/3 |
| 4,278,552 | 7/1981 | Hisamoto et al. | 252/3 |
| 4,325,831 | 4/1982 | Watson et al. | 252/307 |
| 4,461,716 | 7/1984 | Barbarin | 252/3 |
| 4,477,375 | 10/1984 | Grollier | 424/70 |
| 4,540,507 | 9/1985 | Grollier | 424/70 |
| 4,565,647 | 1/1986 | Llenado | 252/307 |

*Primary Examiner*—Stephen J. Lechert, Jr.
*Assistant Examiner*—Howard J. Locker

[57] ABSTRACT

A stable foam concentrate of low viscosity is diluted with water and foamed to form a foam suitable for application to fires and spills of polar liquids or water-immiscible organic materials. The concentrate is an essentially aqueous solution containing 4% to 6% citrus pectin, 3% to 9% alkylbetaine surfactant, 9% to 20% sodium alkyl sulfate surfactant, 4% to 12% alkoamphoglycinate or alkoamphopropionate surfactant, the total amount of surfactant being at least 30%. The concentration may also contain 1% to 4% of a fluorine substituted thioether.

8 Claims, No Drawings

FIRE-FIGHTING FOAM

FIELD OF THE INVENTION

This invention relates to fire-fighting foam compositions and more particularly to foams and concentrates for making foams that are suitable for extinguishing polar chemical fires.

BACKGROUND OF THE INVENTION

Polar chemical compounds, because of their water solubility, cannot be treated with the foam types commonly used to combat spills and fires of water immiscible organic materials. Special foams have been formulated for use on polar compounds, the most widely used containing a polysaccharide. The polysaccharide gels on contact with the polar compound forming a floating layer that separates the foam from the polar liquid and allows a foam blanket to build for fire extinguishment and/or vapor suppression.

Not all polysaccharides exhibit this gelling property, but those that do are also characterized by pseudo water solubility. That is, when mixed with water, they absorb it and disperse uniformly but do not fully dissolve to form a true solution (although they are ordinarily referred to as solutions and are so referred to herein). In most cases the colloidal dispersion is stable, but outside factors can destabilize and cause settling of the polysaccharide.

One category of materials which can cause destabilization is surface active agents. Since a surface active agent is necessary to produce foams, foam chemistries involving polysaccharides can be difficult to formulate. Current formulations use the technique of thickening the foam concentrate formulation such that settling is prevented. Normally, highly viscous materials cannot be handled by the proportioning devices in common use by the fire services. Some currently used foam chemistries are thixotropic, however, and their inherent ability to act as a lower viscosity fluid in high shear flow permits their use with many existing proportioning devices. See, for example, U.S. Pat. Nos. 4,060,132, 4,060,489, 4,149,599 and 4,387,032. Some proportioning arrangements, such as gravity flow to a metering or similar pump, can have difficulties with thixotropic concentrates. Also, at cold temperatures the viscosity of thixotropic concentrates increases to the point that all proportioning devices experience decreased performance. Since there is a critical minimum of foam concentrate in water for foam generation and/or effective fire suppression, a reduction in proportioning rate could be harmful.

SUMMARY OF THE INVENTION

It is an object of this invention to provide a stable foam concentrate of low viscosity that will, on dilution with water, form a foam that forms a blanketing gel mat when applied to polar liquid fires or spills. It is a further object to provide such a concentrate that, when diluted, forms a foam having a surface tension below 19 dynes/sq. cm. that meets certification requirements for a hydrocarbon fire extinguishant.

The invention is based on our discovery that a foam concentrate comprising an aqueous solution of citrus pectin polysaccharide and a combination of (1) alkylbetaine, (2) sodium alkyl sulfate and (3) an alkoamphoglycinate or alkoamphopropionate surfactants has the desired low viscosity, stability against polysaccharide settling, good foam-forming capabilities, and gel-forming capability when applied to polar liquids. Fluorine substituted thioethers can be added to reduce the surface tension of the foam without adversely affecting the concentrate stability, making it suitable for fighting hydrocarbon fires.

DESCRIPTION OF THE INVENTION

The foam concentrates of this invention are aqueous solutions, or pseudo solutions, comprising citrus pectin and a mixture of surfactants that have a low viscosity, suitably less than 1000 cp at 20° C., and that are diluted with water for use. The diluted concentrate is fed to a foam generator to form a foam useful in combatting fires and hazardous material spills. Fire services are currently equipped to proportion concentrates at a 3% or 6% rate, by volume into water. The preferred formulations of this invention are formulated for use at the 6% proportioning rate for use on polar materials and at a 3% proportioning rate for use on water immiscible organic materials in one case and 6% in a second case.

The citrus pectin component of the foam concentrate is most suitably a commercial food grade pectin that may contain minor amounts of admixed sugars or citrates. A 4% (all formulation percentages are by weight) concentration of citrus pectin in the foam concentrate is sufficient to provide an effective gelling foam at the 6% proportioning rate. Pectin concentration can be increased to about 6% without exceeding the viscosity limits of about 1000 cp for practical use in foam generators.

A combination of surfactants is used to provide the foam-forming ability without destabilizing the pectin solution; namely, from about 3% to 9% alkylbetaine surfactant, 9% to 20% sodium alkyl sulfate surfactant and 4 to 12% alkoamphoglycinate or alkoamphopropionate surfactant. The total amount of surfactant must be as least about 30%.

Alkybetaine surfactants have the formula $$RN(CH_3)_2CH_2CO_2$$

in which R is a straight chain hydrocarbon radical having from about 10 to 20 carbon atoms. The preferred alkylbetaine is cocobetaine (derived from coconut oil) in which R is predominantly 12 and ranges from about 10 to 20. Cocobetaine is commercially available under the tradenames Encol DG and McKam CB.

Sodium alkyl sulfate surfactants having about 8 to 13 carbon atoms in the alkyl group are suitable for use. Sodium octyl(ethylhexyl)sulfate and sodium tridecylsulfate are commercially available. Lower order alkyl sulfates are incompatible with the pectin, while higher order materials are solids and adversely effect storage temperature.

The amphoteric alkoamphoglycinates and propionates have the formula $$\begin{array}{c} \qquad\qquad\quad X^1 \\ \qquad\qquad\quad | \\ RCONCH_2CH_2N^+\ X_2 \\ \qquad\qquad\quad | \\ \qquad\qquad\quad CH_2CH_2OH \end{array}$$

where $X^1$ is $CH_2COO$— or $CH_2CH_2COO$— and $X^2$ is H or $CH_2COOH$ and R is an alkyl group having from 8 to 12C atoms. Caproamphocarboxypropionate, caproamphocarboxyglycinate, and cocoamphocarboxyglycinate are illustrative of such surfactants that are available under the tradenames Miranol, Mona and Lonza.

Fluorine substituted thioethers suitable for use in this invention have the formula $R_fCH_2CH_2SCH_2CH_2CO_2Li$ where $R_f$ is $F(CF_2CF_2)_{3-8}$, and are available from DuPont Company under the name Zonyl®.

The dissolution of pectin requires considerable agitation so, to avoid foaming, the pectin is dissolved in water before the surfactants are added to the concentrate. The viscosity of the foam concentrate is on the order of 300 cp at room temperature and is easily handled in conventional proportioning equipment. It will be understood that the concentrate is essentially an aqueous solution but it may contain minor amounts of alcohol or other solvents from the commercial surfactant formulations.

EXAMPLE 1

Exemplifying a now-preferred embodiment for 6% and 3% proportioning, 5 pounds of citrus pectin food grade was dissolved in 65 lbs. of water. To this solution was added 7.5 lbs. of cocobetaine, 10 lbs. of caproamphocarboxypropionate, 10.5 lbs. of ethylhexyl sulfate and 2 lbs. of Zonyl FSA. The concentrate was mixed with water and the resulting solution fed to a foam generator for extinguishing fires in accordance with Underwriters Laboratories UL162, Class B Fire Tests, using designated nozzles, with the following results:

| Fuel | Agent Concentration | Application Rate gpm/ft² | Control Time | Extinguishment Time |
|---|---|---|---|---|
| Heptane | 3% | 0.04 | 1:15 | 1:50 |
| MEK | 6% | 0.06 | 1:30 | 3:00 |
| n butyl Acetate | 6% | 0.06 | 1:05 | 1:45 |
| Isopropanol | 6% | 0.08 | 2:00 | 3:00 |
| Glacial Acetic Acid | 6% | 0.04 | 0:40 | 1:10 |

EXAMPLE 2

A concentrate formulation for 6% proportioning for use on both polar compounds and immiscible organic materials consists of 5.0 pounds of citrus pectin, 9.0 pounds of sodium ethylhexyl sulfate, 7.0 pounds of cocobetaine, 7.0 pounds of caproamphocarboxypropionate, 1.0 pounds of Zonyl FSA and 72.0 pounds of water.

I claim:

1. A foam concentrate for forming a fire-fighting foam comprising an essentially aqueous solution containing between about 4% and 6% by weight citrus pectin, 3% and 9% by weight alkylbetaine surfactant, 9% and 20% by weight sodium alkyl sulfate surfactant having 8 to 13C atoms, and, 4% and 12% by weight alkoamphoglycinate or alkoamphopropionate surfactant, the toal amount of surfactant being at least 30% by weight and the viscosity of the concentrate being less than about 1000 cp. at room temperature.

2. A foam concentrate according to claim 1 containing from about 1% to 4% by weight of a fluorine substituted thioether.

3. A foam concentrate according to claim 1 in which the alkylbetaine is cocobetaine.

4. A foam concentrate according to claim 3 in which the sodium alkyl sulfate is sodium ethylhexyl sulfate or sodium tridecylsulfate.

5. A foam concentrate according to claim 2 in which the alkylbetaine is cocobetaine.

6. A foam concentrate as to claim 5 in which the sodium alkyl sulfate is sodium ethylhexyl sulfate or sodium tridecylsulfate.

7. A solution for forming a foam that forms a gel mat when applied to polar liquid fires consisting of a water diluted solution of a concentrate containing between about 4% and 6% by weight citrus pectin, 3% and 9% by weight alkylbetaine surfactant, 9% and 20% by weight sodium alkylsulfate surfactant having 8 to 13C atoms, and, 4% and 12% by weight alkoamphoglyciante or alkoamphopropionate surfactant, the total amount of surfactant being at least 30% by weight.

8. A solution for forming a foam for fighting polar liquid fires or water immiscible organic liquid fires consisting of a water diluted solution of a concentrate containing beween about 4% and 6% by weight citrus pectin, 1% and 4% by weight fluorine substituted thioether, 3% and 9% by weight alkylbetaine surfactant, 9% and 20% by weight sodium alkyl sulfate surfactant having 8 and 13C atoms, and, 4% and 12% by weight alkoamphoglycinate or alkoamphopropionate surfactant, the total amount of surfactant being at least 30%.

* * * * *